United States Patent [19]

Fujita et al.

[11] Patent Number: 4,671,183
[45] Date of Patent: Jun. 9, 1987

[54] CART TYPE CONVEYING APPARATUS

[75] Inventors: Shigeyoshi Fujita, Suita; Tomoyuki Saski, Amagasaki; Kazuyoshi Fukuhara, Kashiwara; Hirohsi Nishikawa, Osaka, all of Japan

[73] Assignee: Daifuku Co., Ltd., Japan

[21] Appl. No.: 850,153

[22] Filed: Apr. 10, 1986

[30] Foreign Application Priority Data

Apr. 17, 1985 [JP] Japan .................................. 60-81771
Apr. 17, 1985 [JP] Japan ............................. 60-57262[U]
Apr. 17, 1985 [JP] Japan ............................. 60-57263[U]

[51] Int. Cl.[4] ..................... E01B 25/08; E01B 25/22; B61B 3/02; B61B 13/04
[52] U.S. Cl. .................................. 104/93; 104/110; 104/118; 105/141; 105/150
[58] Field of Search ................... 104/89, 93, 106–110, 104/118–121; 105/141, 148, 150

[56] References Cited

U.S. PATENT DOCUMENTS

| | | | |
|---|---|---|---|
| 3,604,434 | 9/1971 | Hurst | 104/93 X |
| 3,845,723 | 11/1974 | Jacobs et al. | 104/121 X |
| 3,855,941 | 12/1974 | Fromme et al. | 105/150 |
| 4,037,541 | 7/1977 | Giessler et al. | 104/109 |
| 4,531,460 | 7/1985 | Pamer | 105/150 |

*Primary Examiner*—Randolph A. Reese
*Attorney, Agent, or Firm*—Webb, Burden, Robinson & Webb

[57] ABSTRACT

A cart type conveying apparatus comprising a guide rail having a substantially U-shaped section and including upper and lower horizontal extensions, and a conveyor cart including trolleys guided by the guide rail. The upper and lower extensions define guide grooves, respectively. Supporting wheels and centering rollers attached to lower positions of the trolleys are fitted in the guide grooves defined in the lower extension, and retaining wheels and centering rollers attached to upper positions of the trolleys are fitted in the guide groove defined in the upper extension.

3 Claims, 8 Drawing Figures

CART TYPE CONVEYING APPARATUS

BACKGROUND OF THE INVENTION

This invention relates to a cart type conveying apparatus used in various fields of industry to convey various articles along a predetermined conveying route.

The cart type conveying apparatus comprises a guide rail having a substantially U-shaped section and including an upper horizontal extension and a lower horizontal extension, a conveyor cart including trolleys guided by the guide rail, supporting wheels supported to be rotatable on horizontal axes at lower positions of the trolleys, retaining wheels supported to be rotatable on horizontal axes at upper positions of the trolleys, lower centering rollers supported to be rotatable on vertical axes at the lower positions of the trolleys, and upper centering rollers supported to be rotatable on vertical axes at the upper positions of the trolleys. The conveyor cart generally includes a drive trolley and a follower trolley, and a carrier bed is supported by or suspended from these trolleys. Each of the trolleys is provided with the wheels and the rollers noted above.

As shown in FIGS. 7 and 8 of the accompanying drawings a known conveying apparatus of this type comprises a guide rail 1 including an upper extension 51 and a lower extension 52 defining guide ridges 53 and 54, respectively. Lower centering rollers 55 are opposed to each other across lateral sides of the ridge 54, and upper centering rollers 56 are opposed to each other across lateral sides of the ridge 53. Supporting wheels 57 are mounted on an upper face of the ridge 54 of the lower extension 52. Retainer wheels 58 are placed in contact with a lower face of the ridge 53 of the upper extension 51.

In the drawings, number 59 denotes a drive trolley having an electric motor 60, number 61 denotes a follower trolley, number 62 denotes a carrier bed, numbers 63 and 64 denote bed supporting arms, number 65 denotes an electric conductor and signal transmitter unit, number 66 denotes a collector unit, number 67 denotes a pair of upper and lower rail covers, and number 68 denotes guide rail support stands.

The carrier bed 62 and the supporting arms 63 and 64 are pivotally interconnected to be oscillatable on vertical axes 69 and horizontal axes 70 to permit the cart to travel smoothly through horizontal and vertical curves. Therefore, each of the trolleys 59 and 60 has one supporting wheel 57 and one pair of retaining wheels 58. Further, each trolley has the lower centering rollers 55 at one position and the upper centering rollers 56 at two positions longitudinally of the cart. In other words, where the carrier bed 62 and the supporting arms 63 and 64 are rigidly interconnected, only one retaining wheel 58 is required and the upper centering rollers 56 may be provided at one logitudinal position. But, to permit the drive trolley 59 and the follower trolley 61 to control their own postures, it is necessary to provide a pair of forward and rearward retaining wheels 58 and the upper centering rollers 56 at two longitudinal positions as described above.

The drive trolley 59 and the follower trolley 61 are capable of controlling their own postures by providing a pair of forward and rearward supporting wheels 57, one retaining wheel 58, the lower centering rollers 55 at two longitudinal positions, and the upper centering rollers 56 at one longitudinal position. But then the supporting wheels 57 should desirably have a large diameter to bear a great load, and generally only one supporting wheel is provided. It will be understood that either the upper or lower centering rollers 55 or 56 may be provided at two longitudinal positions.

According to the cart type conveying apparatus as noted above, since the lower centering rollers 55 and the upper centering rollers 56, respectively, are disposed opposite each other across the ridges 53 and 54, it is necessary to secure spaces for permitting passage of the centering rollers 55 and 56 laterally of the ridge 54 on which the supporting wheels 57 run and the ridge 53 on which retaining wheels 58 run. Although the spaces for the centering rollers 55 and 56 disposed outwardly of the guide rail 1 may be secured with little problem, the spaces for the centering rollers 55 and 56 disposed inwardly of the guide rail 1 can be secured only by elongating the upper extension 51 and the lower extension 52. This results in disadvantages of requiring a large amount of material for forming the guide rail 1 thereby increasing the manufacturing cost and of heavy guide rail 1 which renders installation work difficult.

Furthermore, since the lower centering rollers 55 and the upper centering rollers 56 perform their centering function by being disposed at both lateral sides of the ridges 53 and 54, the centering rollers 55 and 56 inevitably are provided in a large number. Accordingly, the apparatus includes a large number of components which not only makes assembly work troublesome but results in increased manufacturing cost and increased weights of the trolleys 59 and 61.

Where each of the trolleys 59 and 61 is adapted to control its own posture by means of the centering rollers 53 and 54 provided at both lateral sides of the ridges 53 and 54, each trolley must have as many as six centering rollers 55 and 56.

SUMMARY OF THE INVENTION

An object of this invention is to save the material for forming the guide rail, lightening the guide rail, and to reduce the number of centering rollers.

Another object of this invention is to reduce the longitudinal dimensions of the trolleys while permitting the trolleys to control their own postures.

In order to achieve the above objects, a cart type conveying apparatus according to this invention is characterized in that guide grooves are defined in a lower face of the upper horizontal extension and an upper face of the lower horizontal extension, respectively, the retaining wheels and the upper centering rollers being fitted in the guide groove defined in the upper horizontal extension, and the supporting wheel and the lower centering rollers being fitted in the guide groove defined in the lower horizontal extension. This construction has the following function and effect:

The lower centering rollers and the upper centering rollers perform their centering function through contact with lateral walls of the guide grooves. The supporting wheels are mounted on a bottom face of the guide groove defined in the lower extension. The retainer wheels are placed in contact with the guide groove defined in the upper extension.

Therefore, spaces in the longitudinal direction of the guide rails for accommodating the supporting wheels and the retaining wheels are used also for accommodating the centering rollers. This helps to reduce the length of the upper and lower horizontal extensions of the guide rail. Consequently, the invention has the advantages of reducing the material for forming the guide rail thereby lowering the manufacturing cost, and of lightening the guide rail to facilitate installation work.

Since the lower centering rollers and the upper centering rollers perform the centering function independently, only a small number of centering rollers is required. This feature has the advantages of low manufacturing cost and lightweight trolleys as well as easy assembly work due to the reduced number of components.

In a preferred embodiment of this invention, a cart type conveying apparatus comprises trolleys each including a single supporting wheel, a pair of forward and rearward retaining wheels, lower centering rollers disposed forwardly and rearwardly of the supporting wheel, and an upper centering roller disposed between the retaining wheels.

According to this embodiment, the trolley includes at a lower portion thereof one supporting wheel and two centering rollers arranged in the longitudinal direction of the cart and at an upper portion thereof two retaining wheels and one centering roller arranged in the longitudinal direction, whereby the trolley is capable of controlling its own posture. Therefore, this trolley has smaller longitudinal dimensions than a case where one supporting wheel and one centering roller are arranged at the lower portion of the trolley longitudinally of the cart and two retaining wheels and two centering rollers are arranged at the upper portion of the trolley longitudinally of the cart.

Other advantages of the invention will be apparent from the following description.

BRIEF DESCRIPTION OF THE DRAWINGS

The drawings illustrate a cart type conveying apparatus embodying this invention, in which.

DESCRIPTION OF THE PREFERRED EMBODIMENTS

Figure 1:
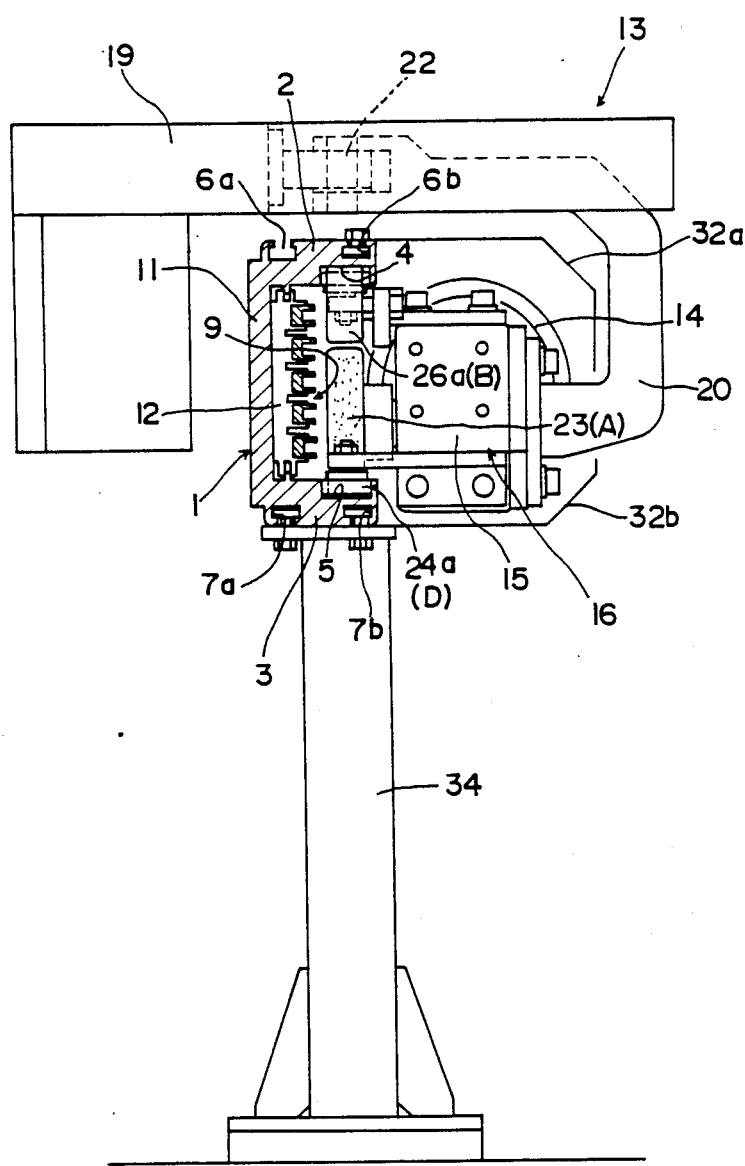
FIG. 1 is a front view in vertical section of the apparatus.
Figure 2:
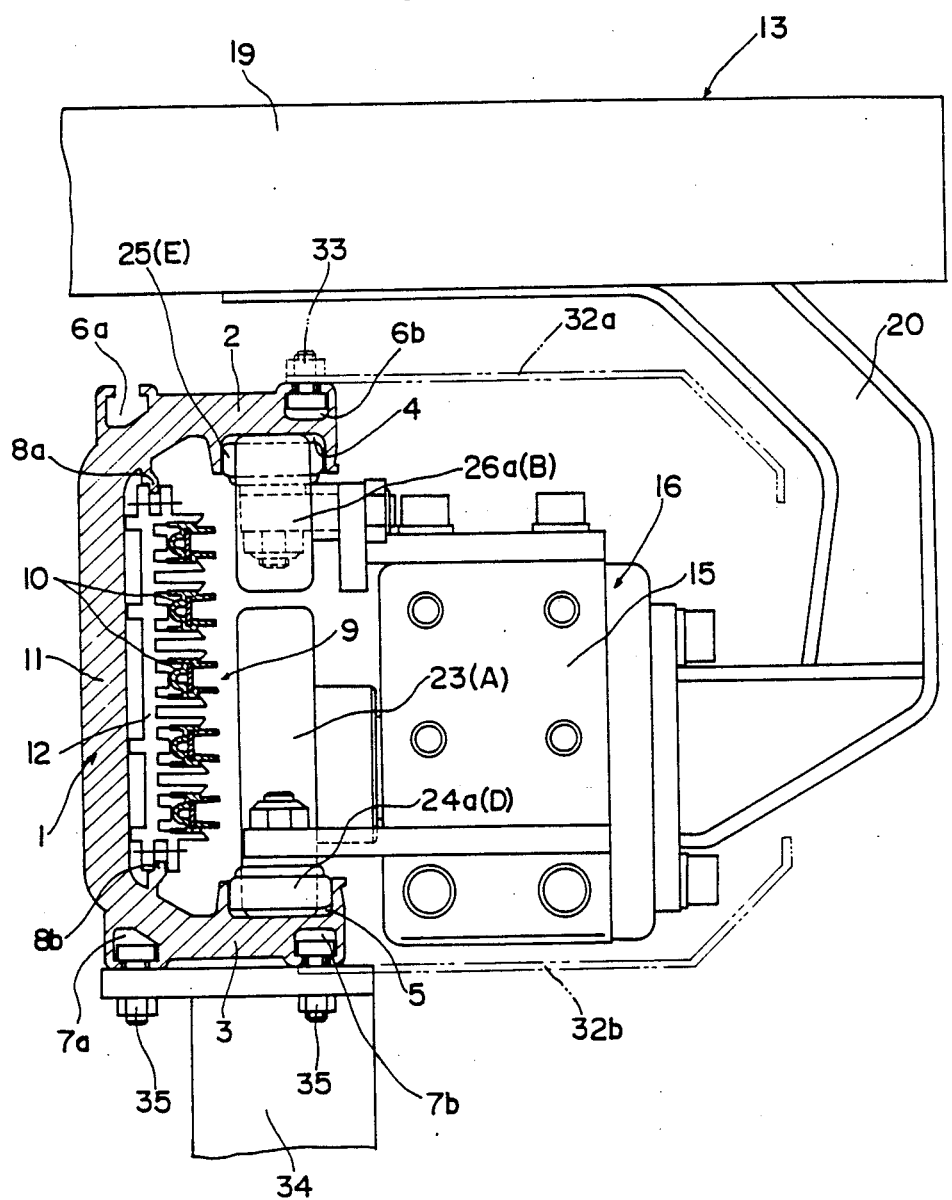
FIG. 2 is an enlarged view of a principal portion of the apparatus shown in FIG. 1.

FIGS. 1 through 5 show one example of cart type conveying apparatus embodying this invention.

Number 1 denotes a guide rail having a substantially U-shaped section defining upper and lower horizontal extensions 2 and 3. As shown in detail in FIG. 2, guide grooves 4 and 5 are defined in a lower face of the upper extension 2 and in an upper face of the lower extension 3. The upper extension 2 further defines races 6a and 6b at opposite lateral positions on an upper face thereof for mounting bolts and nuts. Similarly, the lower extension 3 defines races 7a and 7b at opposite lateral positions on a lower face thereof for mounting bolts and nuts. The guide rail 1 includes mutually opposed ridges 8a and 8b at base ends of the upper and lower extensions 2 and 3. Number 9 denotes an electric conductor and signal transmitter rail unit including a plurality of vertically arranged conductor rails 10. The rail unit 9 is supported adjacent a vertical wall 11 of the guide rail 1 by conductor rail supports 12 arranged at suitable intervals along the guide rail 1. Each support 12 is fixed at upper and lower ends thereof to the ridges 8a and 8b.

Number 13 denotes a conveyor cart comprising a drive trolley 16 including a motor 14 and a reduction mechanism 15 directly connected to each other and constituting a trolley body, a follower trolley 18 carrying collector units 17a and 17b forwardly and rearwardly thereof, and a carrier bed 19. The carrier bed 19 is disposed right over the guide rail 1, and is connected to upper ends of a pair of forward and rearward bed supporting arms 20 and 21. The bed supporting arms 20 and 21 are removably attached at lower ends thereof to outer lateral faces (i.e. the lateral faces not opposed or adjacent to the guide rail 1) of the drive trolley 16 and follower trolley 18, respectively. The carrier bed 19 is rotatable on a vertical axis 22 disposed right over the guide grooves 4 and 5 of the guide rail 1 (FIG. 1).

The trolleys 16 and 18 include lower supporting wheels A rotatable on horizontal axes, upper retaining wheels B rotatable on horizontal axes, lower centering rollers D rotatable on vertical axes, and upper centering rollers E rotatable on vertical axes. Each of the trolleys 16 and 18 will particularly be described next. By way of expediency for the understanding of the constructions of the trolleys 16 and 18, the references A, B, D and E affixed to the wheels and rollers will be replaced with different references in the description to follow.

The drive trolley 16 comprises a single supporting wheel 23 attached to and driven by a transverse output shaft of the reduction mechanism 15 and fitted in the lower guide groove 5 of the guide rail 1, a pair of centering rollers 24a and 24b fitted in the lower guide groove 5 forwardly and rearwardly of the wheel 23, a single centering roller 25 disposed right over the wheel 23 and fitted in the upper guide groove 4 of the guide rail 1, and a pair of retainer wheels 26a and 26b fitted in the upper guide groove 4 forwardly and rearwardly of the centering roller 25. The drive trolley 16 is supported by these wheels 23, 26a and 26b and rollers 24a, 24b and 25 to project laterally outwardly from the guide rail 1.

The follower trolley 18 comprises a single supporting wheel 27 fitted in the lower guide groove 5 of the guide rail 1, a pair of centering rollers 28a and 28b fitted in the lower guide groove 5 forwardly and rearwardly of the wheel 27, a single centering roller 29 disposed right over the wheel 27 and fitted in the upper guide groove 4 of the guide rail 1, and a pair of retainer wheels 30a and 30b fitted in the upper guide groove 4 forwardly and rearwardly of the centering roller 29. As is the drive trolley 16, the follower trolley 18 is supported by the wheels 28, 30a and 30b and rollers 28a, 28b and 29 to project laterally outwardly from the guide rail 1.

Figure 3:
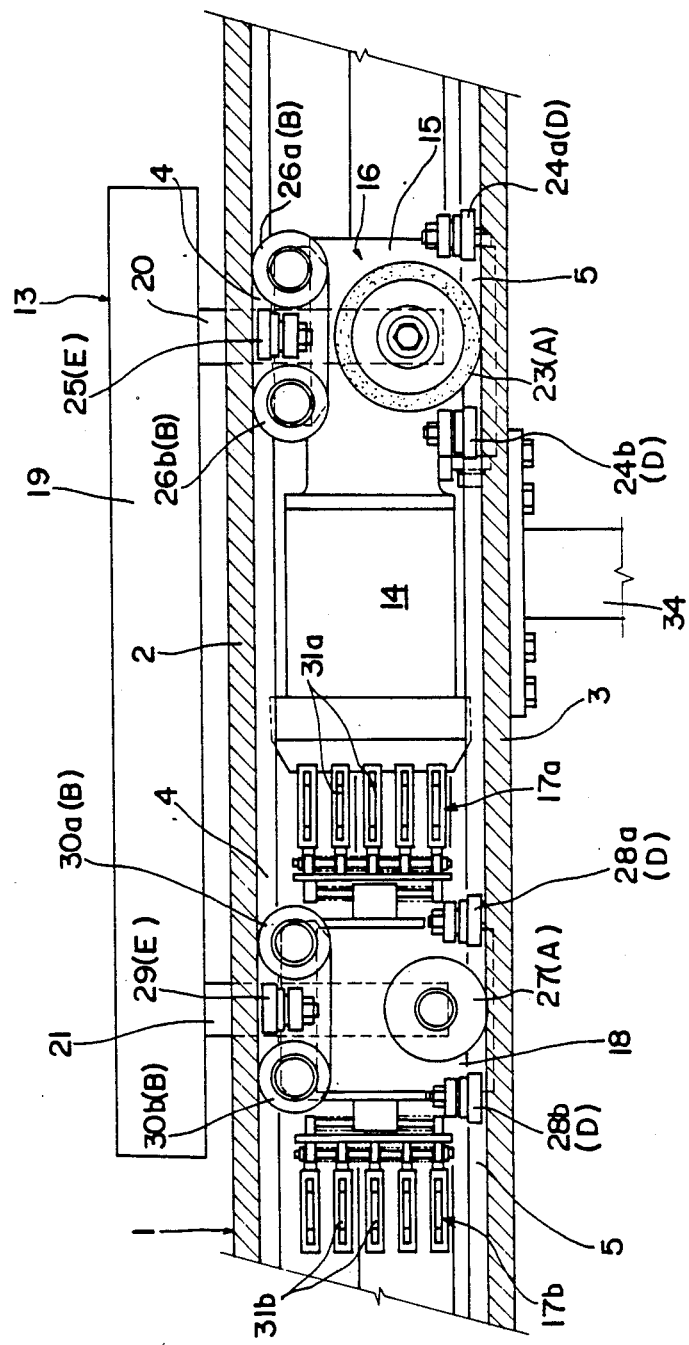
FIG. 3 is a side view in vertical section of the apparatus.
Figure 4:
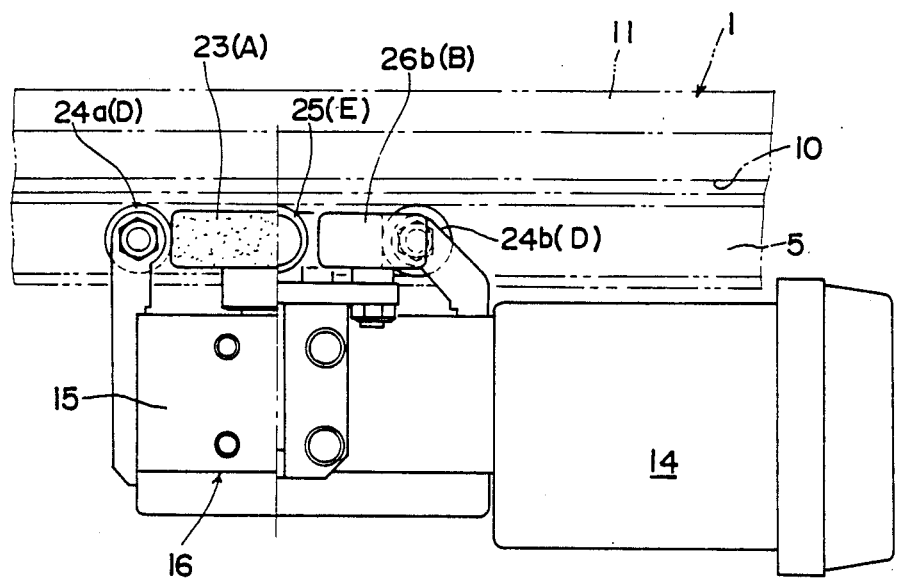
FIG. 4 is a plan view, partly broken away, of a drive trolley.
Figure 5:
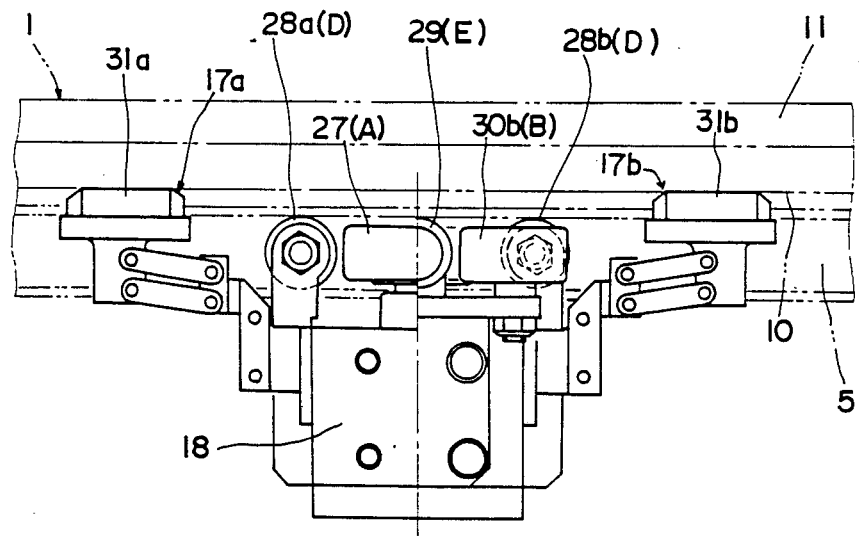
FIG. 5 is a plan view, partly broken away, of a follower trolley.

As shown in FIGS. 3 and 5, the collector units 17a and 17b include a plurality of vertically arranged collecting elements 31a and 31b in sliding contact with the conductor rails 10, respectively. A pair of collecting elements 31a and 31b that contact the same conductor rail 10 are electrically connected to each other. The collecting elements 31a and 31b are resiliently supported to be in pressure contact with and smoothly slidable along the corresponding conductor rail 10 even if the conductor rail 10 may slightly deviate up and down relative to the collecting elements 31a and 31b. While this arrangement is basically the same as in the prior art, the characterizing feature of this embodiment resides in that the two collector units 17a and 17b are separately disposed, i.e. forwardly and rearwardly of the follower trolley 18 and the wheels 27, 30a and 30b and the rollers 28a, 28b and 29 of the follower trolley 18 are arranged between the two collector units 17a and 17b. This arrangement minimizes transverse dimensions of the entire conveying apparatus including the guide rail 1 and the conveyor cart 13 and the total length of the conveyor cart 13.

Numbers 32a and 32b denote a pair of upper and lower rail covers attached by means of bolts and nuts 33 to one of the upper races 6b and one of the lower races 7b of the guide rail 1. Number 34 denotes guide rail struts attached by bolts and nuts 35 to selected longitudinal positions of the guide rail 1 utilizing the lower races 7a and 7b of the guide rail 1.

With the cart type conveying apparatus as constructed above, the conveyor cart 13 receives power supply control signals from the conductor rails 10 of the electric conductor and signal transmitter rail unit 9 through the collecting elements 31a and 31b of the collector units 17a and 17b to operate the motor 14 and to drive the supporting wheel 23 of the drive trolley 16. This propels the drive trolley 16 causing the conveyor cart 13 to travel forward or backward along the guide rail 1. While the cart 13 is traveling, the pairs of forward and rearward wheels 26a, 26b, 30a and 30b rotatable on the horizontal axes prevent the drive trolley 16 and the follower trolley 18 from inclining forwardly or rearwardly, and the centering rollers 24a, 24b, 25, 28a, 28b and 29 rotatable on the vertical axes and provided three each for the trolleys 16 and 18 maintain the trolleys 16 and 18 parallel to the guide rail 1 in plan view.

Where the guide rail 1 includes vertical curves also, the connections between the bed supporting arms 20, 21 and the carrier bed 19 may be provided with means to permit relative rotation on horizontal axes, with the collector units 17a and 17b arranged vertically oscillatable relative to the follower trolley 18.

Figure 6:
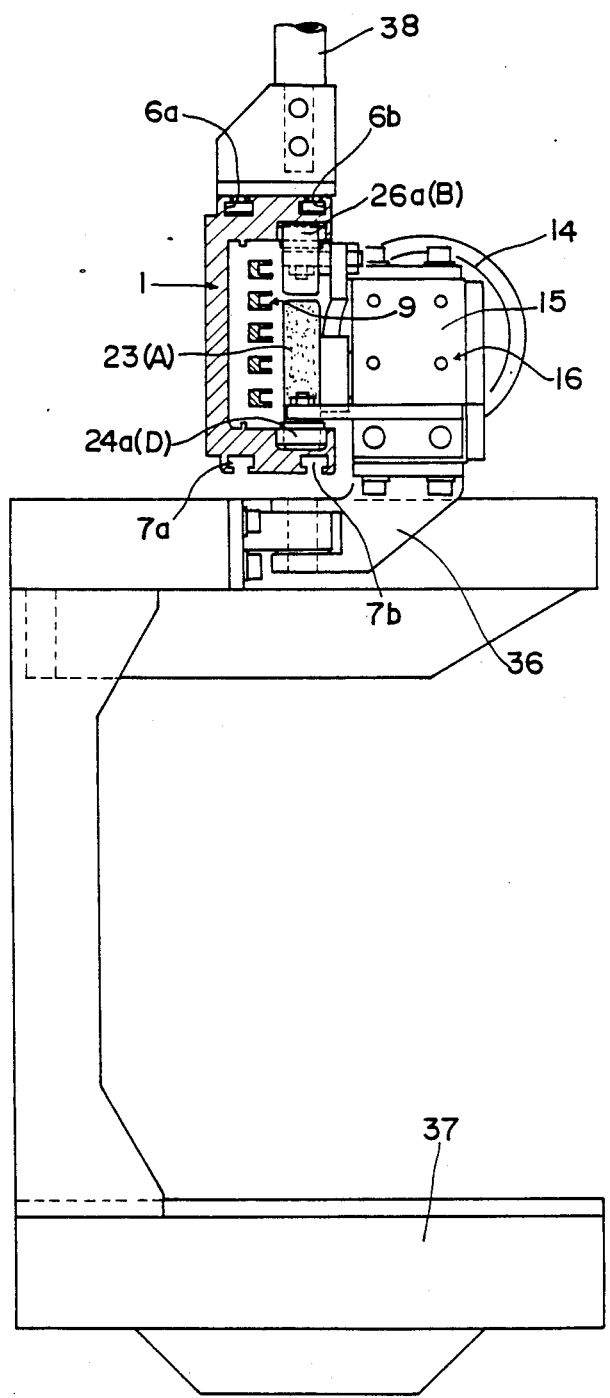
FIG. 6 is a front view in vertical section of a modified apparatus.
Figure 7:
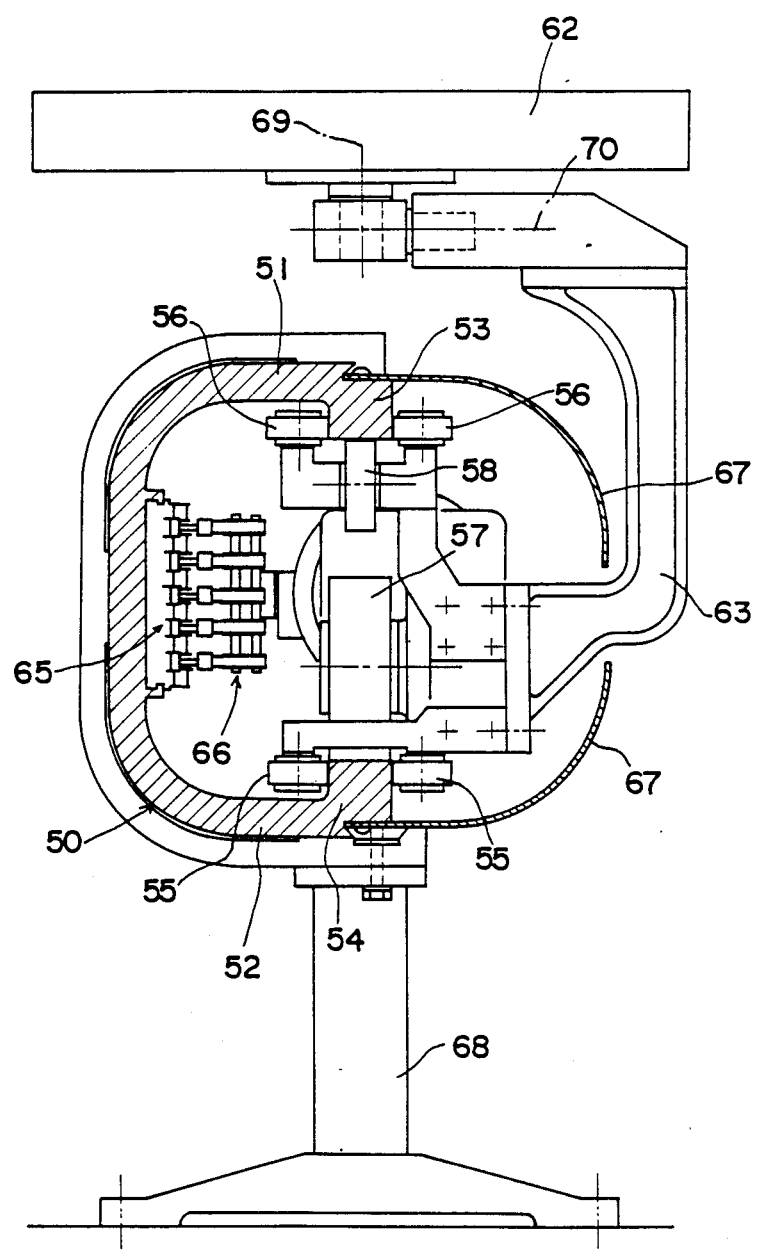
FIG. 7 is a front view in vertical section of a prior art apparatus.
Figure 8:
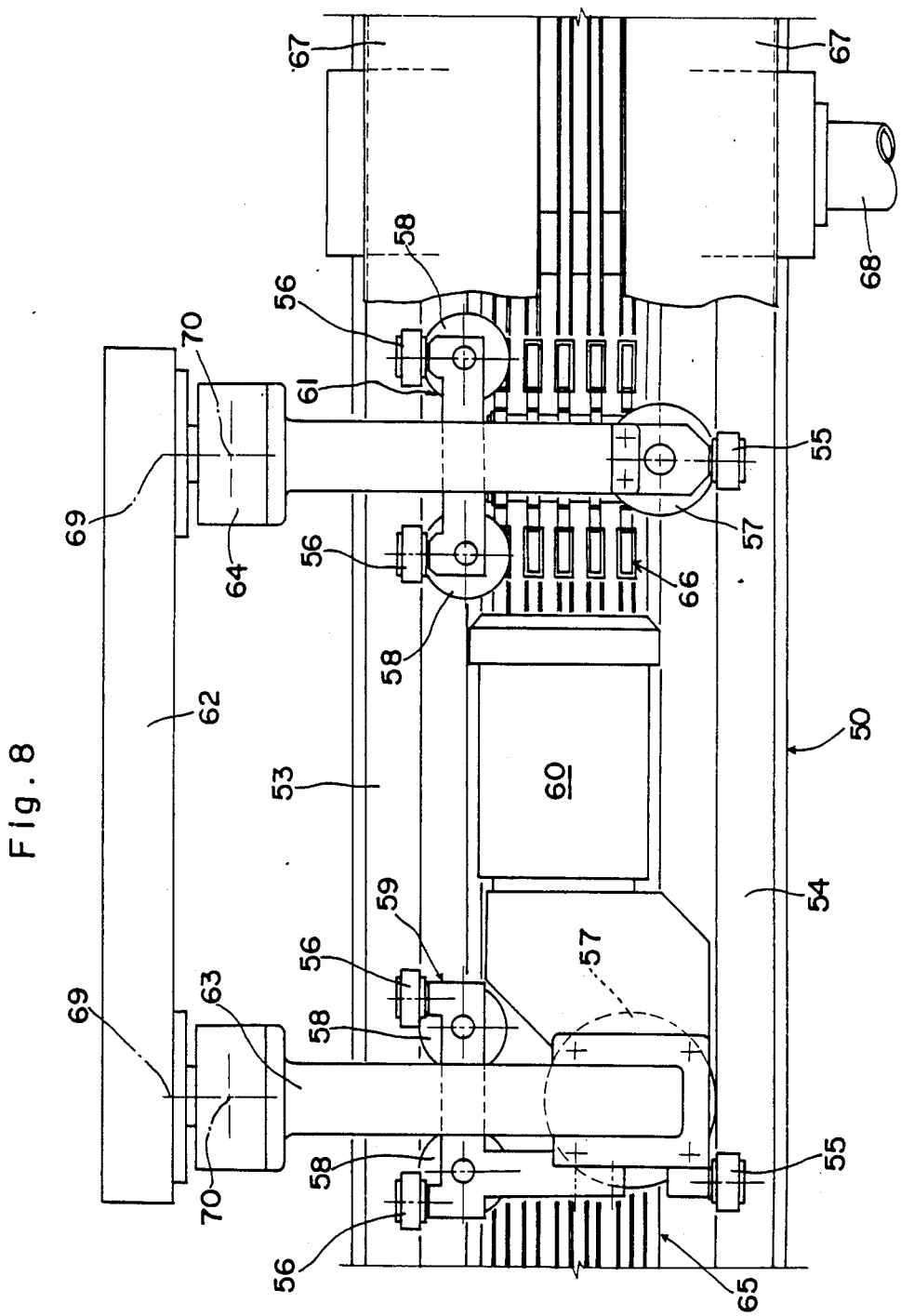
FIG. 8 is a side view, partly broken away, of the prior art apparatus.

Another embodiment will be described next. As shown in FIG. 6, the carrier bed may be suspended by means of suspension arms 36 removably attached to bottom faces of the drive trolley 16 and the follower trolley 18. In this case, the guide rail 1 may be suspended by means of suspension rods 38 attached at selected longitudinal positions of the guide rail 1 by means of bolts and nuts utilizing the upper races 6a and 6b.

When the guide rail 1 comprise a plurality of interconnected lengths of rail, the bolt and nut mounting upper and lower races 6a, 6b, 7a and 7b defined in the guide rail may be utilized for securing the ends of coupler plates to upper and lower lateral sides of adjacent lengths of guide rail.

What is claimed is:

1. A cart type conveying apparatus comprising;
   a guide rail (1) having a substantially U-shaped section and including an upper horizontal extension (2) and a lower horizontal extension (3),
   a conveyor cart (13) including trolleys (16, 18) guided by said guide rail (1),
   supporting wheel means (A) supported to be rotatable on horizontal axes at lower positions of said trolleys (16, 18),
   retaining wheel means (B) supported to be rotatable on horizontal axes at upper positions of said trolleys (16, 18),
   lower centering roller means (D) supported to be rotatable on vertical axes at the lower positions of said trolleys (16, 18), and
   upper centering roller means (E) supported to be rotatable on vertical axes at the upper positions of said trolleys (16, 18),
   wherein guide grooves (4, 5) are defined in a lower face of said upper horizontal extension (2) and an upper face of said lower horizontal extension (3), respectively, said retaining wheel means (B) and said upper centering roller means (E) being fitted in the guide groove (4) defined in said upper horizontal extension (2), and said supporting wheel means (A) and said lower centering roller means (D) being fitted in the guide groove (5) defined in said lower horizontal extension (3).

2. A cart type conveying apparatus as claimed in claim 1 wherein said supporting wheel means (A) comprises a single wheel, and said retaining wheel means (B) comprises a pair of forward and rearward wheels, said lower centering roller means (D) being disposed forwardly and rearwardly of the supporting wheel means (A), said upper centering roller means (E) being disposed between said pair of forward and rearward wheels (B).

3. A cart type conveying apparatus as claimed in claim 1 or 2 wherein races (6a, 6b, 7a, 7b) are defined in opposite lateral positions of an upper face of said upper horizontal extension (2) and in opposite lateral positions of a lower face of said lower horizontal extension (3) for mounting bolts and nuts.

* * * * *